(12) United States Patent
Hu

(10) Patent No.: US 12,470,812 B2
(45) Date of Patent: Nov. 11, 2025

(54) PHOTOGRAPHIC SYSTEM AND CONTROL METHOD FOR HETEROGENEOUS VIDEO ARCHITECTURE

(71) Applicant: Getac Technology Corporation, New Taipei (TW)

(72) Inventor: Chien-Chih Hu, Taipei (TW)

(73) Assignee: Getac Technology Corporation, New Taipei (TW)

( * ) Notice: Subject to any disclaimer, the term of this patent is extended or adjusted under 35 U.S.C. 154(b) by 134 days.

(21) Appl. No.: 18/489,144

(22) Filed: Oct. 18, 2023

(65) Prior Publication Data

US 2025/0133286 A1 Apr. 24, 2025

(51) Int. Cl.
*H04N 23/60* (2023.01)
*H04N 23/661* (2023.01)
*H04N 23/90* (2023.01)

(52) U.S. Cl.
CPC ........... *H04N 23/64* (2023.01); *H04N 23/661* (2023.01); *H04N 23/90* (2023.01)

(58) Field of Classification Search
CPC ....... H04N 23/64; H04N 23/661; H04N 23/90
USPC ...................................... 348/222.1
See application file for complete search history.

(56) References Cited

U.S. PATENT DOCUMENTS

| | | | | |
|---|---|---|---|---|
| 8,380,663 | B2 * | 2/2013 | Thode | G06F 16/273 707/610 |
| 11,467,757 | B1 * | 10/2022 | Bora | G06F 3/0659 |
| 2008/0065753 | A1 * | 3/2008 | Rao | H04L 67/125 709/223 |
| 2008/0195962 | A1 * | 8/2008 | Lin | G06F 16/40 715/771 |
| 2011/0242270 | A1 * | 10/2011 | Dinka | H04N 7/15 348/14.11 |
| 2014/0002664 | A1 * | 1/2014 | Hanabusa | H04N 5/04 348/159 |
| 2014/0143545 | A1 * | 5/2014 | McKeeman | H04L 63/08 713/168 |
| 2014/0293059 | A1 * | 10/2014 | Park | H04W 4/029 348/158 |
| 2015/0062340 | A1 * | 3/2015 | Datta | H04N 1/00244 348/148 |

(Continued)

FOREIGN PATENT DOCUMENTS

| | | |
|---|---|---|
| CN | 106162070 A | 11/2016 |
| CN | 115341599 A | 11/2022 |

*Primary Examiner* — Usman A Khan
(74) *Attorney, Agent, or Firm* — Cooper Legal Group, LLC

(57) ABSTRACT

A photographic system includes a host and a plurality of camera devices. A data port of the host is connected to a control circuit of a non-camera device. A first camera device is connected to a first wireless communication module of the host in a wireless manner, a second camera device is connected to a wired network module of the host in a wired manner, and the first camera device and the second camera device are configured to photograph a surrounding environment and generate current event information indicating that photography starts. A processing module of the host receives the current event information from the non-camera device, the first camera device, and the second camera device, and generates a trigger signal according to the current event information, to trigger the plurality of camera devices except the camera device generating the current event information to start photography.

20 Claims, 12 Drawing Sheets

(56) References Cited

U.S. PATENT DOCUMENTS

| | | | | |
|---|---|---|---|---|
| 2015/0195451 A1* | 7/2015 | Glover | ................ | H04N 23/695 |
| | | | | 348/211.4 |
| 2016/0072861 A1* | 3/2016 | Woolsey | ............... | H04L 65/401 |
| | | | | 455/414.1 |
| 2016/0358080 A1* | 12/2016 | Blanco | ................ | G08B 15/007 |
| 2016/0373617 A1* | 12/2016 | Choi | ................... | H04N 23/661 |
| 2017/0116873 A1* | 4/2017 | Lendvay | .................. | G09B 5/02 |
| 2018/0011627 A1* | 1/2018 | Siracusano, Jr. | ....... | H04L 65/80 |

* cited by examiner

PHOTOGRAPHIC SYSTEM AND CONTROL METHOD FOR HETEROGENEOUS VIDEO ARCHITECTURE

BACKGROUND OF THE INVENTION

The present invention relates to a photographic system, and in particular, to a photographic system and a heterogeneous video architecture, which may control all camera modules in the heterogeneous video architecture to correspondingly start photography.

In recent years, with improvement in people's safety awareness, street monitors and related technologies have played an important role in safety improvement, traffic management, and emergency response. Cities and local governments usually mount monitors in public places to improve public safety, monitor and prevent crime, and assist law enforcement agencies in responding to emergencies. In addition to mounting monitors at fixed positions and mobile vehicles on the streets, police officers may also assist in police work by wearing body worn cameras when on duty. Media data recorded in the monitor or the camera may further be used to provide evidence and clarify liability in the future.

SUMMARY OF THE INVENTION

In view of this, the present invention provides a photographic system and control method for heterogeneous video architecture, so that when a specified event occurs in any device in the heterogeneous video architecture, all camera devices in the heterogeneous video architecture may photography simultaneously, to record changes in a surrounding environment with images.

In an embodiment, the photographic system includes a host and a plurality of camera devices, and the host is connected to the camera devices. The host includes at least one data port, a first wireless communication module, a wired network module, and a processing module. The at least one data port is connected to a control circuit of at least one non-camera device on a periphery. The processing module is connected to the at least one data port, the first wireless communication module, and the wired network module to receive current event information from one of the at least one data port, the first wireless communication module, and the wired network module. The pluralities of camera devices are connected to the host, where the pluralities of camera devices include at least one first camera device and at least one second camera device. At least one first camera device is connected to the first wireless communication module in a wireless manner, where the first camera device is configured to photograph a surrounding environment and correspondingly generate the current event information indicating that photography starts. At least one second camera device is connected to the wired network module in a wired manner, where the second camera device is configured to photograph the surrounding environment and correspondingly generate the current event information indicating that photography starts. The current event information is generated by one of the at least one non-camera device, the first camera device, and the second camera device, the processing module generates a trigger signal according to the current event information, and the trigger signal triggers the plurality of camera devices except the camera device generating the current event information to start photography.

In an embodiment, control method for heterogeneous video architecture includes: connecting a control circuit of at least one non-camera device on a periphery through at least one data port; connecting at least one first camera module in a plurality of camera devices through a wireless communication module; connecting at least one second camera module in the plurality of camera devices through at least one connection cable; receiving current event information through one of the at least one data port, the wireless communication module, and the at least one connection cable, where the current event information indicates that the camera device starts to photograph a surrounding environment or indicates that the non-camera device performs a specified operation; generating a trigger signal according to the current event information; sending the trigger signal to the plurality of camera devices except the camera device generating the current event information; and starting photography in response to the trigger signal.

DETAILED DESCRIPTION OF THE INVENTION

Figure 1:
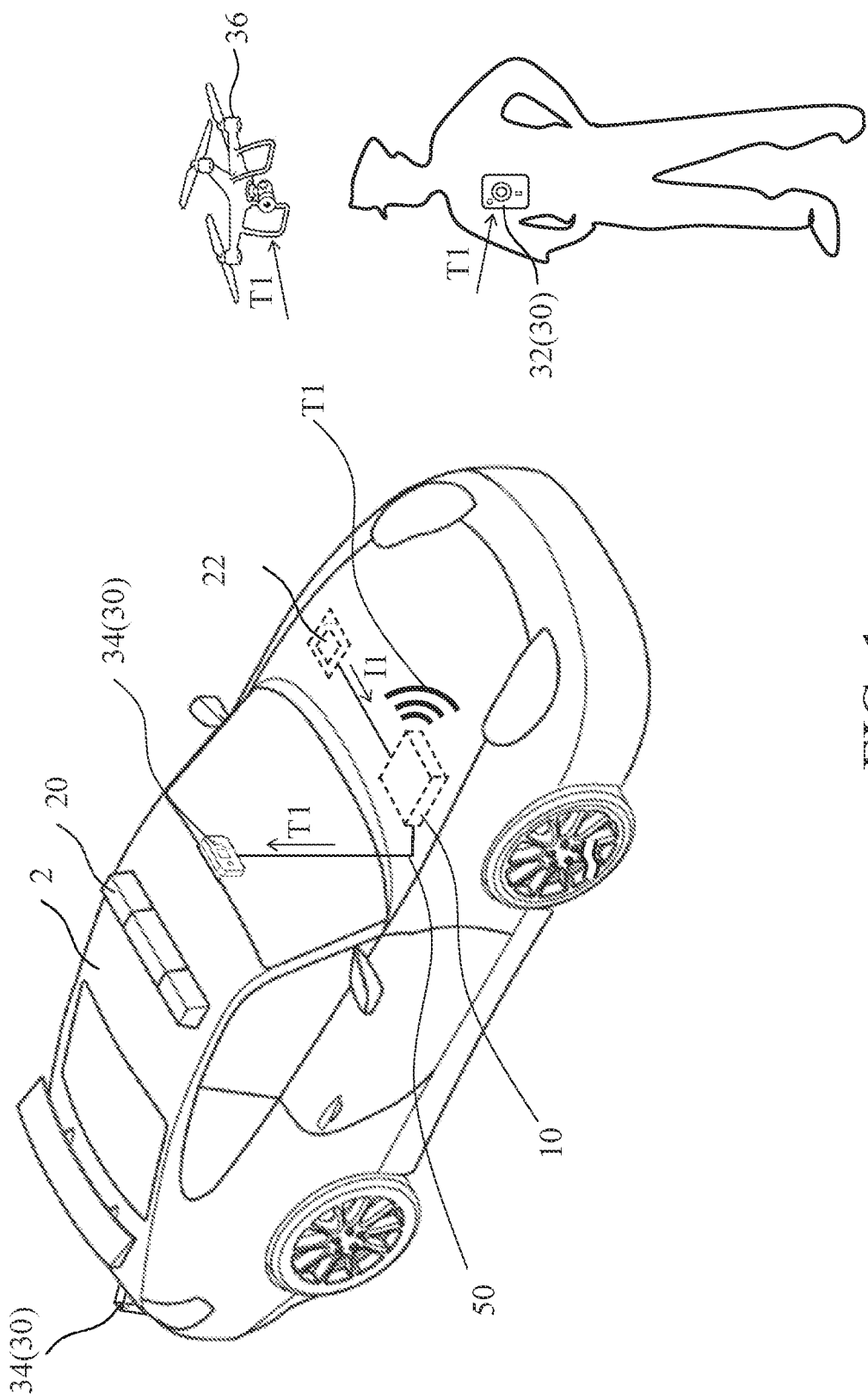
FIG. 1 is a schematic diagram of a state of a photographic system according to an embodiment.
Figure 2:
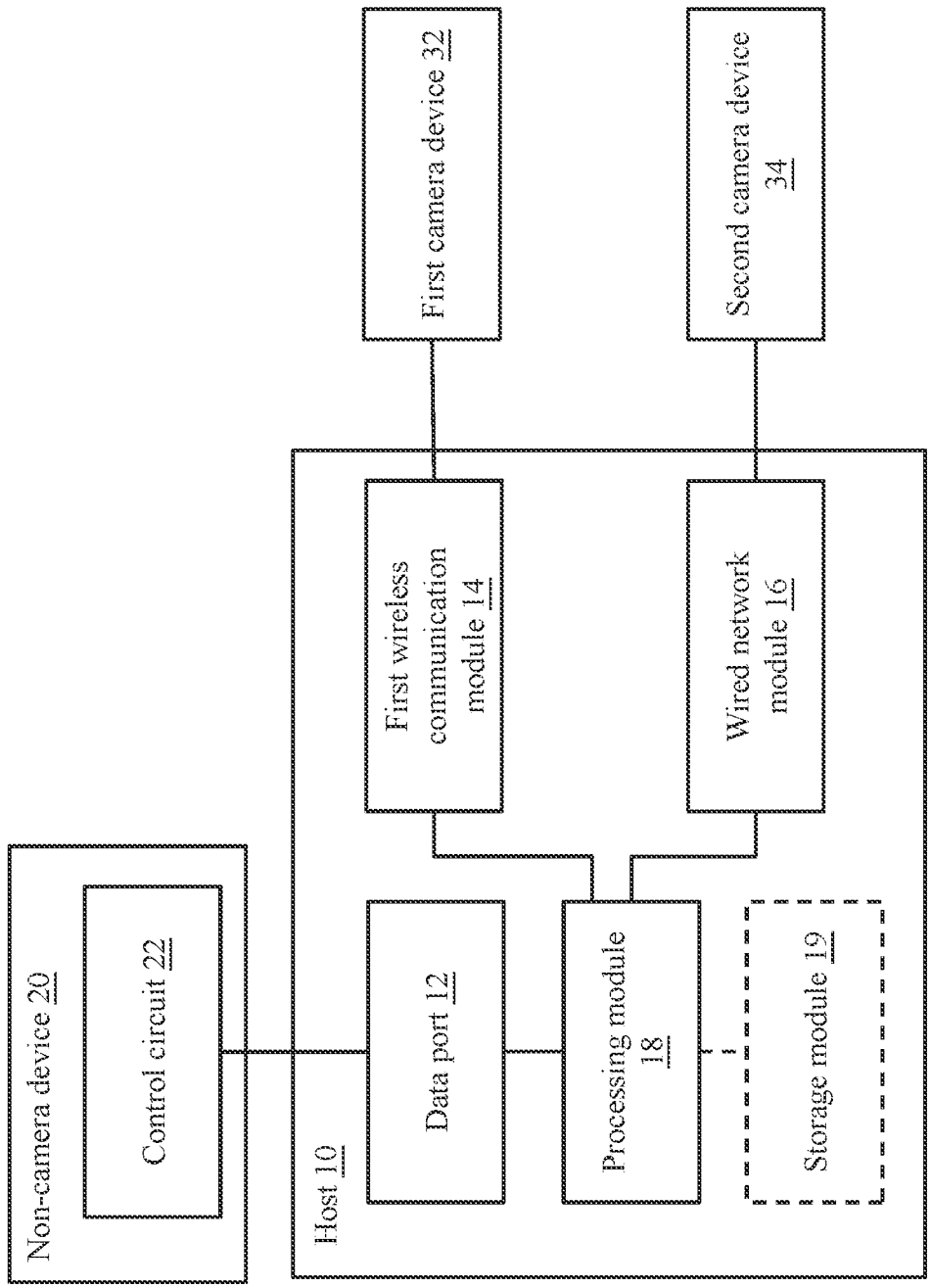
FIG. 2 is a functional block diagram of an exemplary example of a host in FIG. 1 and a device connected to the host.
Figure 3:
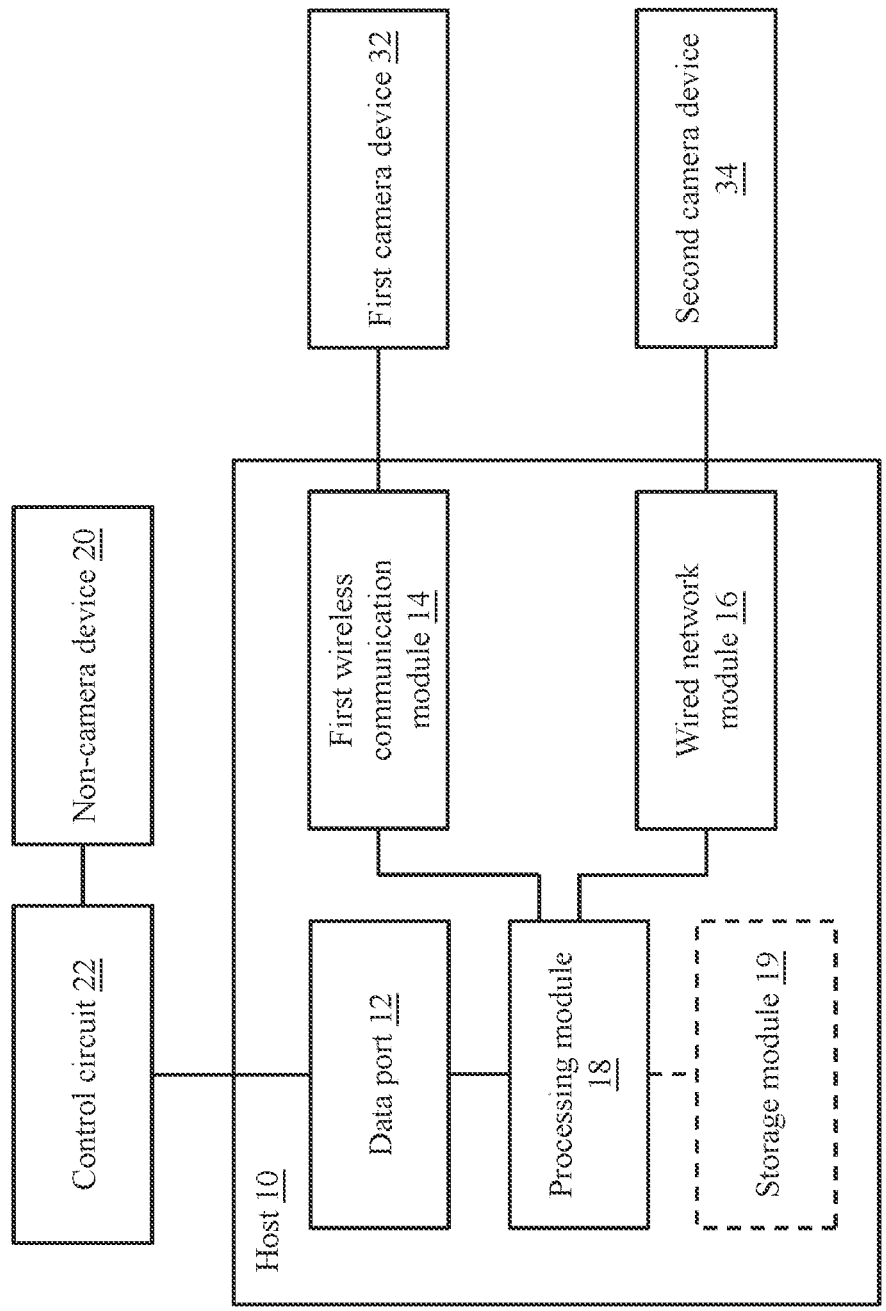
FIG. 3 is a functional block diagram of another exemplary example of a host in FIG. 1 and a device connected to the host.

Refer to FIG. 1 to FIG. 3. The photographic system includes a host 10 and a plurality of camera devices 30. The host 10 is connected to the camera devices 30 through a network. The plurality of camera devices 30 includes two types of camera devices (which are respectively referred to as a first camera device 32 and a second camera device 34) connected to the host 10 in different connection manners. Although FIG. 1 and FIG. 2 merely show a single first camera device 32 and a single second camera device 34, a quantity is not limited. Actually, the photographic system can also be equipped with a plurality of first camera devices 32 and a plurality of second camera devices 34 according to actual requirements.

The host 10 includes at least one data port 12, a wireless communication module (hereinafter referred to as a first wireless communication module 14), a wired network module 16, and a processing module 18.

The host 10 is connected to each first camera device 32 and each second camera device 34. In this case, the processing module 18 is connected to each first camera device 32 in a wireless manner through the first wireless communication module 14, and the processing module 18 is further connected to each second camera device 34 in a wired manner through the wired network module 16. In other words, a channel on a wireless connection network is established between the host 10 and the first camera device 32. The host 10 and the first camera device 32 are connected through a connection cable 50, and a channel on a wired communicate network is established between the host and the first camera device.

In addition, at least one non-camera device 20 is arranged on a periphery of the host 10. Therefore, in addition to being connected to the camera devices 30, the host 10 is further connected to a control circuit 22 of the at least one non-camera device 20. In this case, the processing module 18 is connected to the control circuit 22 through the data port 12. In other words, the host 10 and the control circuit 22 of the non-camera device 20 are connected through a data cable, and a channel between the host and the non-camera device is provided by the data cable. For example, the host 10 may be arranged on a vehicle 2. In this case, the control circuit 22 may be implemented through a vehicle electronic motherboard of the vehicle 2 or an electronic device installed on the vehicle 2 (for example, an intercom, a buzzer, an alerting light, a coffer, or the like). The vehicle electronic motherboard is generally configured to control various mechanical assemblies of the vehicle 2 (for example: a window lift assembly, an airbag assembly, a seat belt assembly, a steering gear assembly, and the like), and the electronic device installed on the vehicle 2 may be independent of the control circuit 22 of the vehicle 2. The data port 12 of the host 10 is connected to a data port (not shown) on the vehicle 2 through a connection cable (not shown), thereby performing data transmission with the control circuit 22.

In an exemplary example, one control circuit 22 can control a single non-camera device 20. In another exemplary example, one control circuit 22 can also simultaneously control a plurality of non-camera devices 20. In some embodiments, the host 10 may have a single data port 12. In some other embodiments, the host 10 may also have a plurality of data ports 12, to be connected to a plurality of control circuits 22.

In this case, the host 10, the plurality of camera devices 30, and the non-camera device 20 may form a heterogeneous video architecture in which cooperation is performed. One non-camera device 20, one first camera device 32, and one second camera device 34 are used as an example below, but a quantity is not limited in the present invention.

Figure 4:
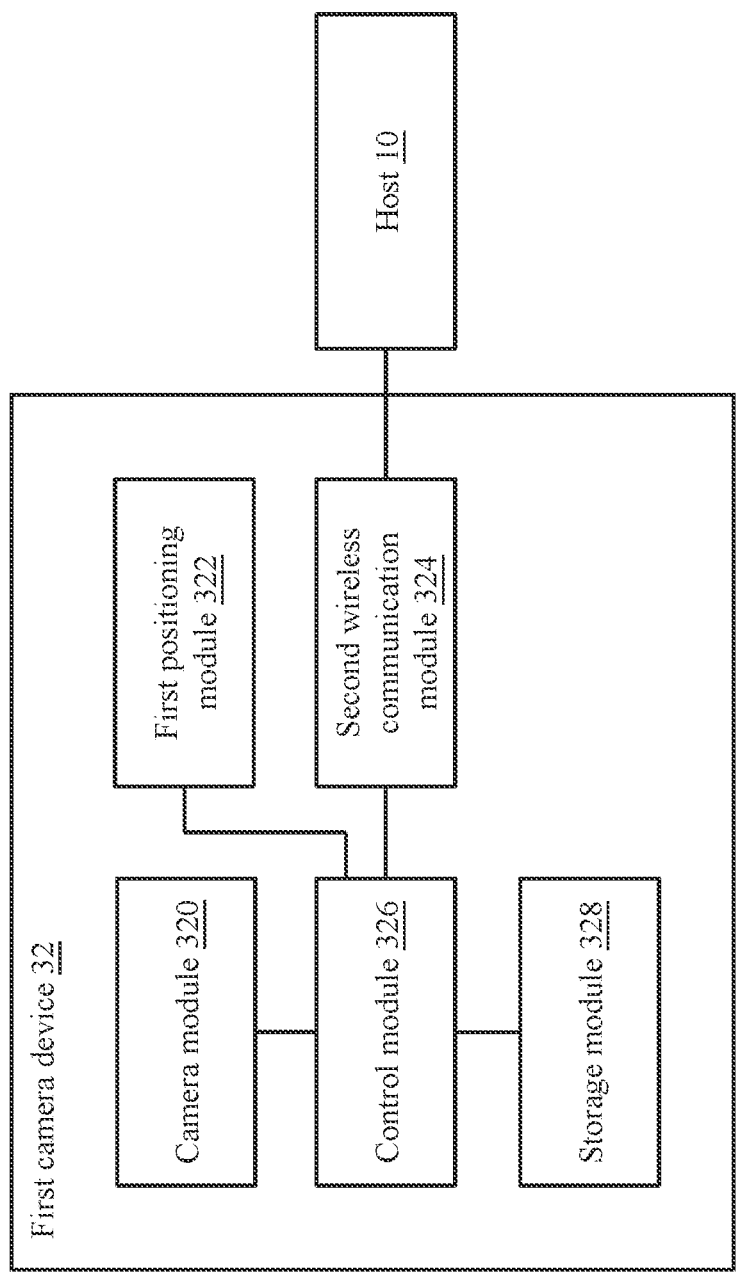
FIG. 4 is a functional block diagram of an exemplary example of a first camera device in FIG. 1.

Refer to FIG. 4. In some embodiments, the first camera device 32 includes a camera module 320, a positioning module (hereinafter referred to as a first positioning module 322), a communication module (hereinafter referred to as a second wireless communication module 324), and a control module 326. The control module 326 is connected to the camera module 320, the first positioning module 322, and the second wireless communication module 324. The second wireless communication module 324 is connected to the first wireless communication module 14 of the host 10 in a wireless manner, to establish communication between the first camera device 32 and the host 10.

The camera module 320 is configured to photograph a surrounding environment, to generate an image of the surrounding environment. In some embodiments, the camera module 320 may be in an enabled state at any time, and is triggered to enable a photographing module. In some other embodiments, the camera module 320 may also be in a disabled state by default, and is activated to start photograph. The control module 326 is configured to control operation of components (that is, the camera module 320, the first positioning module 322, and the second wireless communication module 324). The first positioning module 322 perform positioning on a position of the first camera device 32 to generate geographic data indicating the position of the first camera device 32 (hereinafter referred to as first geographic data G1). The first geographic data G1 may be, for example, latitude and longitude coordinates, and the like.

In some embodiments, the first camera device 32 may further include a storage module 328. The storage module 328 is connected to the control module 326. When the first camera device 32 starts photography, the control module 326 can store the image generated by the camera module 320 when photographing the surrounding environment in the storage module 328. In addition, the control module 326 may also store the first geographic data G1 independently or store a currently photographed image generated in combine with the first geographic data G1 in the storage module 328.

Figure 5:
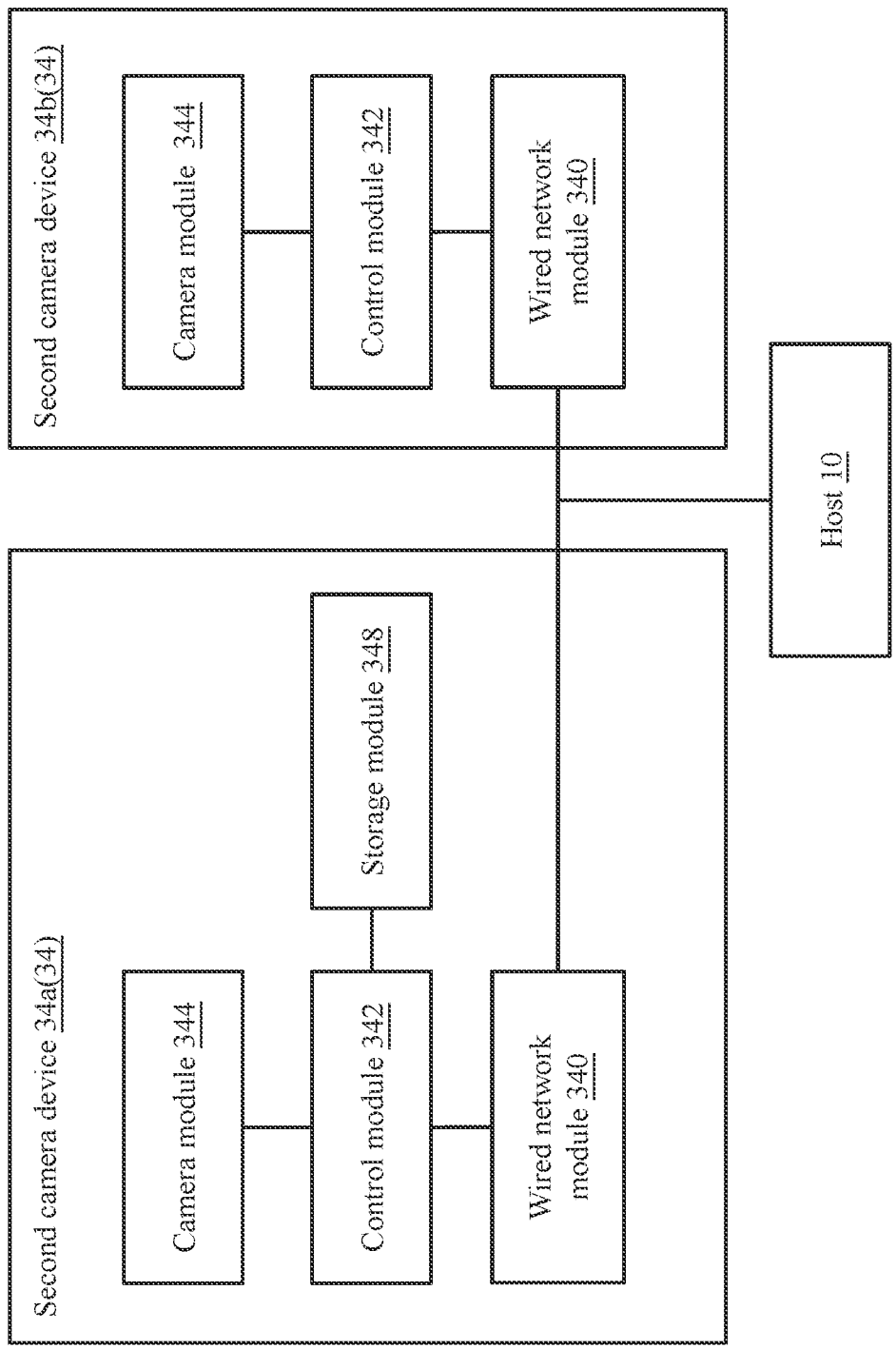
FIG. 5 is a functional block diagram of an exemplary example of a second camera device in FIG. 1.

Refer to FIG. 5. In some embodiments, the second camera device 34 includes a wired network module 340, a control module 342, and a camera module 344. The second camera device 34 is connected to the host 10 through the wired network module 340, and the control module 342 controls operation of the camera module 344. In addition, the second camera device 34 may be divided into two types: a second camera device 34a with a storage module 348, and a second camera device 34b without the storage module 348. Two second camera devices 34a and 34b may simultaneously exist, or only one of the two second camera devices may exist. When the two second camera devices simultaneously exist, the two second camera devices 34a and 34b may be connected to each other through an intranet. The storage module 348 is configured to store an image photographed by the camera module 344. When the second camera device 34b cannot transmit the photographed image to external memory storage through the wired network module 340, the second camera device 34b may transmit, through a connection with the second camera device 34a, the photographed image to the storage module 348 of the second camera device 34a for storage.

For example, the driving recorder of the vehicle 2 may have a front lens that captures a front image of the vehicle 2 and a rear lens that captures a rear image of the vehicle 2. Only the front lens has the storage module 348, and the image captured by the rear lens may be transmitted to the storage module 348 of the front lens for storage.

Figure 6:
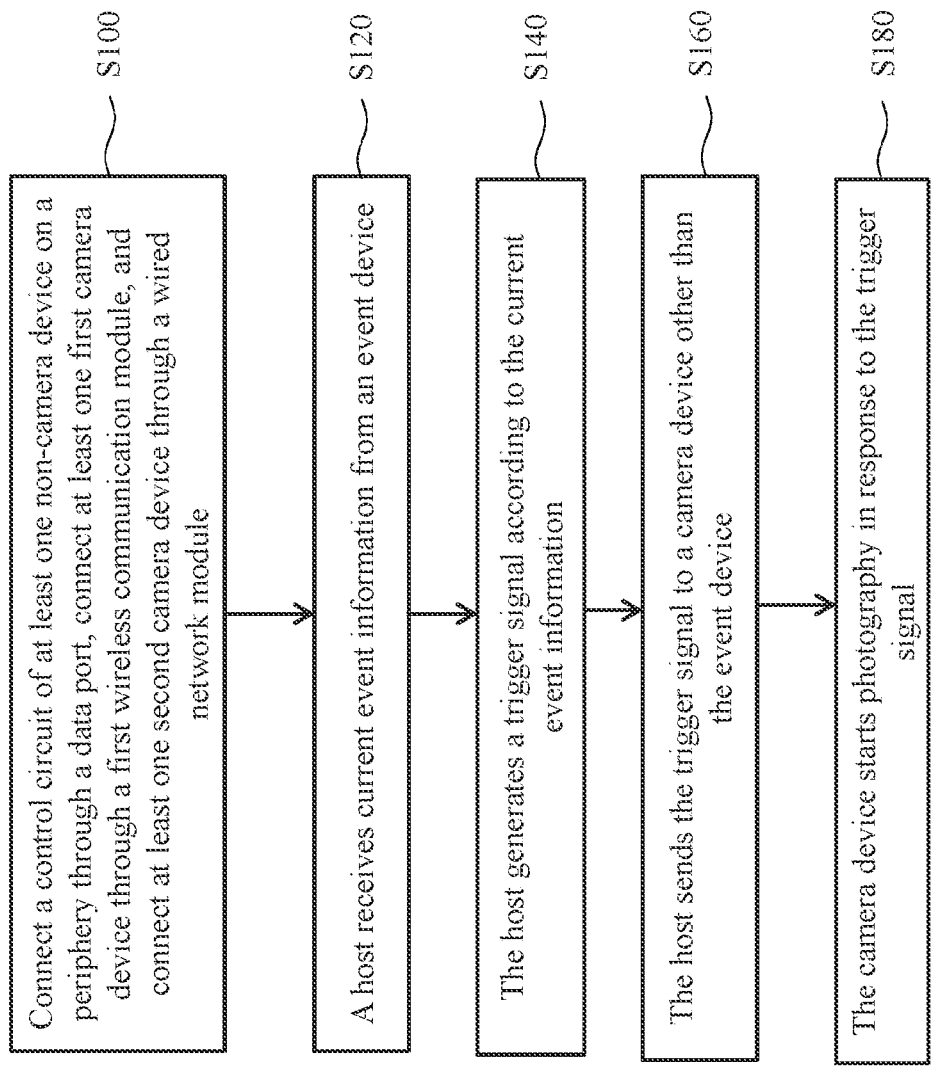
FIG. 6 is a flowchart of control method for heterogeneous video architecture according to an embodiment.

Refer to FIG. 1, FIG. 2, and FIG. 6. When the photographic system runs, the host 10 is connected to the control circuit 22 of the non-camera device 20 and each camera device through the data port 12, the first wireless communication module 14, and the wired network module 16, and detects whether there is current event information I1 from the control circuit 22 and/or any camera device 30 (step S100). When a specified event occurs in any device (hereinafter referred to as an event device) in the non-camera device 20, the first camera device 32, and the second camera device 34, the event device may generate current event information I1 indicating occurrence of the specified event, and may send the current event information I1 to the host 10 (for example, the event device shown in FIG. 1 is a non-camera device 20). The processing module 18 receives the current event information I1 from a connection interface corresponding to the event device (that is, the data port 12, the first wireless communication module 14, or the wired network module 16) (step S120), and generates a trigger signal T1 according to the received current event information I1 (step S140). Then, the processing module 18 sends the generated trigger signal T1 to the camera device 30 other than the event device (step S160). The camera device 30 starts photography in response to the trigger signal T1 (step S180).

Figure 7:
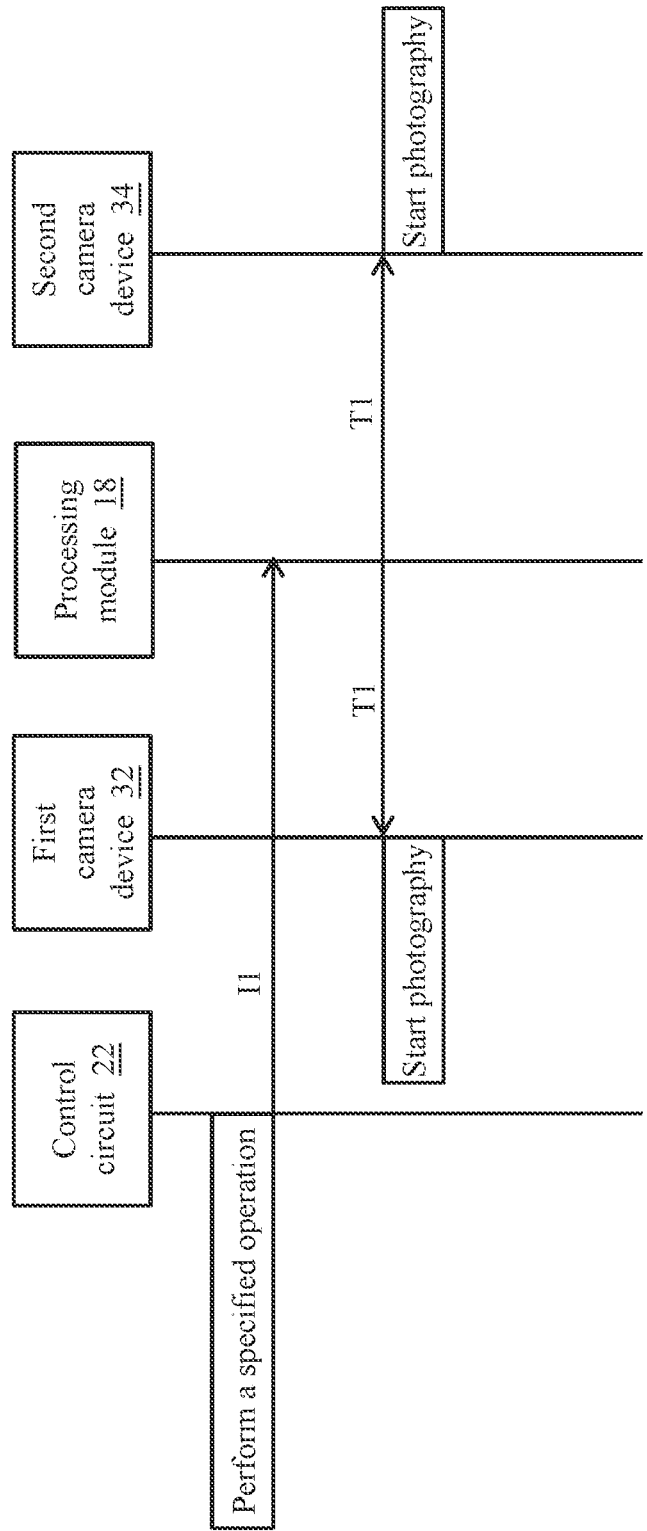
FIG. 7 is a schematic diagram of operation of the photographic system in FIG. 1.

For example, assuming that the non-camera device 20 has a specified operation, and the occurrence of the specified event means that the specified operation is performed. Refer to FIG. 7 together. When the non-camera device 20 performs a specified operation, the control circuit 22 of the non-camera device 20 generates current event information I1 indicating that the specified operation has been performed, and sends the current event information I1 to the host 10 through the connection cable 50. The processing module 18 of the host 10 receives the current event information I1 through the data port 12 and generates the trigger signal T1 accordingly. Then, the processing module 18 separately transmits the generated trigger signal T1 to the first camera device 32 and the second camera device 34 through the first wireless communication module 14 and the wired network module 16. After receiving the trigger signal T1, the first camera device 32 and the second camera device 34 start photography in response to the trigger signal T1, thereby recording images of changes in the surrounding environment.

Figure 8:
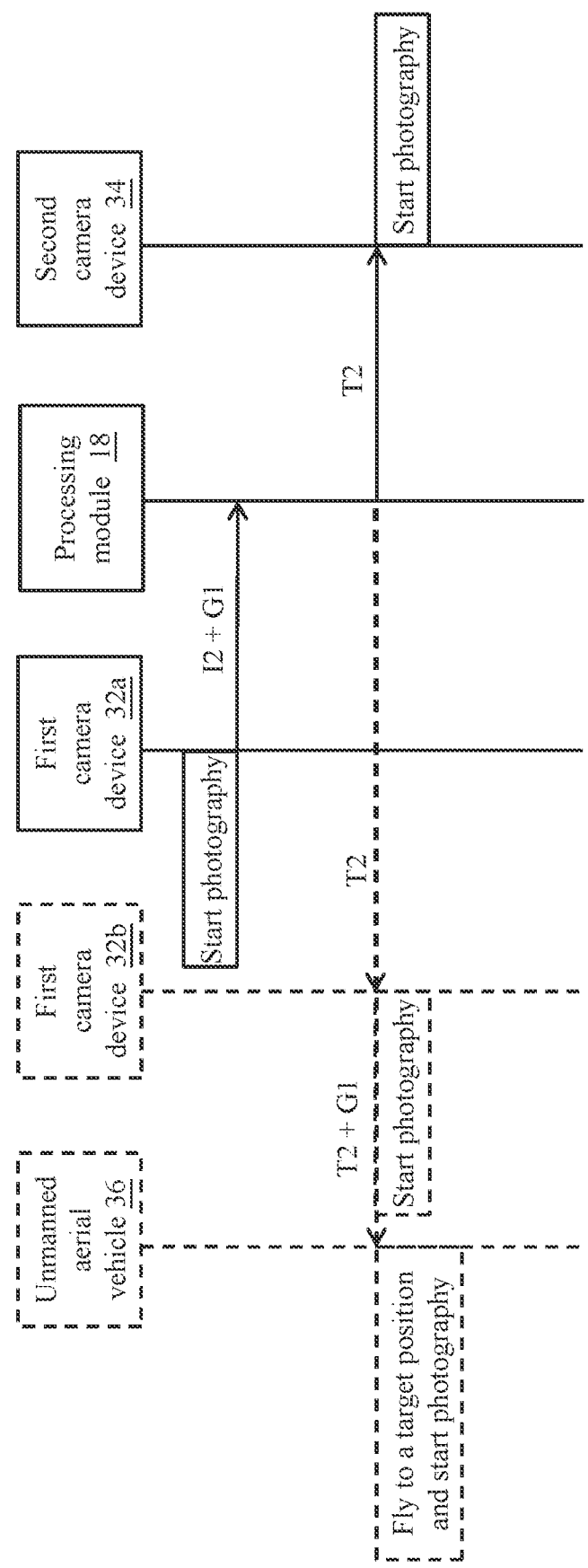
FIG. 8 is another schematic diagram of operation of the photographic system in FIG. 1.

In another example, assuming that the specified event of the first camera device 32 is to perform photography, and the occurrence of the specified event is to start photography. Refer to FIG. 8 together. When a specified event occurs in a first camera device 32a (that is, the camera module 320 starts photography), the control module 326 generates current event information I2 indicating the occurrence of the specified event. After receiving the trigger signal T2, the second camera device 34 starts photography in response to the trigger signal T2. The control module 326 sends the current event information I2 to the host 10 through the second wireless communication module 324. The processing module 18 of the host 10 receives the current event information I2 through the first wireless communication module 14 and generates the trigger signal T2 accordingly. Subsequently, the processing module 18 transmits the trigger signal T2 to the second camera device 34 through the wired network module 16.

For example, when the photographic system has another camera device 30 (for example, using the second camera device 34 as an example) than the first camera device 32a, after the first camera device 32a starts photography, the second camera device 34 may also receive the trigger signal T2 and be triggered accordingly to start photography. If there is another first camera device 32b in the photographic system (that is, there are a plurality of first camera devices 32a and 32b and at least one second camera device 34), after the first camera device 32a starts photography, in addition to transmitting the trigger signal T2 to each second camera device 34 through the wired network module 16, the processing module 18 may further transmit the trigger signal T2 to the first camera device 32b through the first wireless communication module 14. After receiving the trigger signal T2, the first camera device 32b and the second camera device 34 start photography in response to the trigger signal T2.

Figure 9:
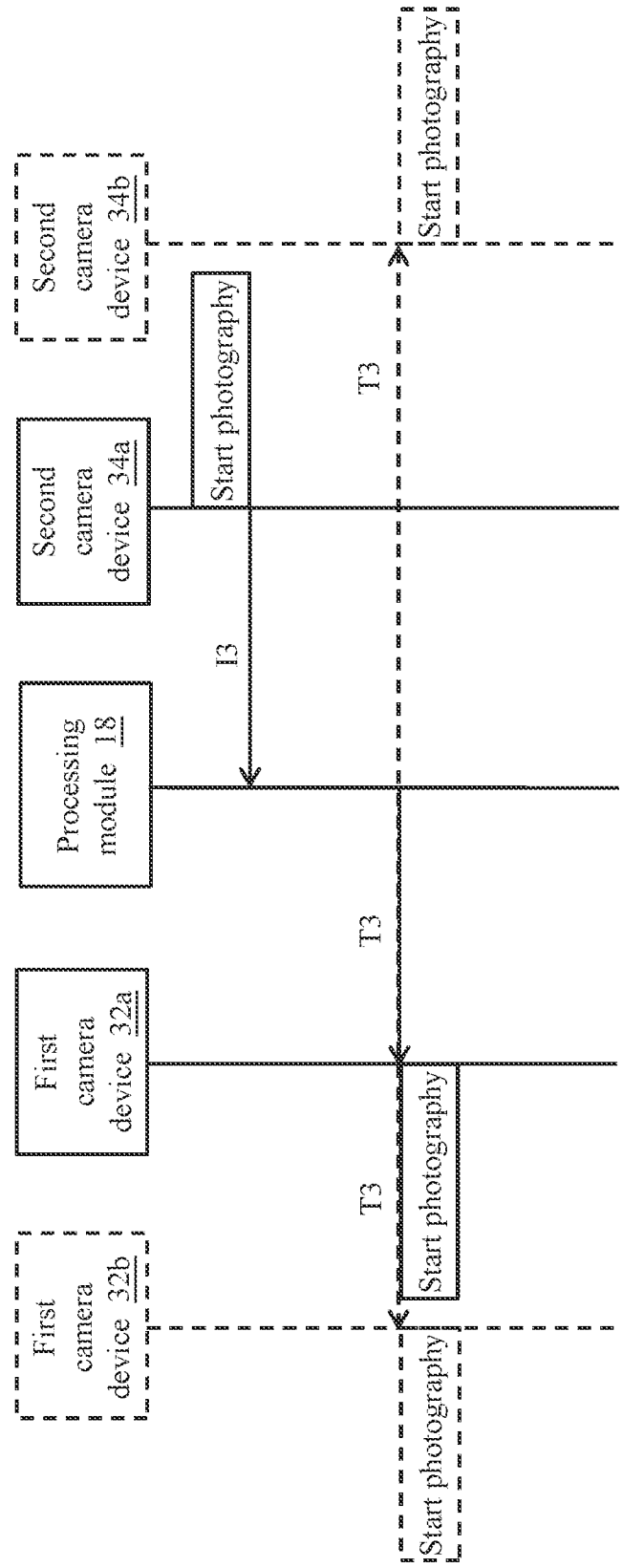
FIG. 9 is still another schematic diagram of operation of the photographic system in FIG. 1.

Furthermore, the specified event of the second camera device 34 may also be to perform photography, and the occurrence of the specified event means that the second camera device 34 starts to perform photography. Refer to FIG. 2, FIG. 5, and FIG. 9. By using an example in which the camera device 30 has two first camera device 32a and 32b, and two second camera devices 34a and 34b, when the camera module 344 of the second camera device 34a starts photography, the control module 342 generates current event information I3 indicating that photography is being performed and sends the current event information I3 to the host 10 through the wired network module 340. The processing module 18 of the host 10 receives the current event information I3 through the wired network module 16 and generates a trigger signal T3 accordingly. In this case, the event device is the second camera device 34a, and the processing module 18 sends the generated trigger signal T3 to the camera device 30 other than the event device. Therefore, the processing module 18 sends the trigger signal T3 to the first camera devices 32a and 32b through the first wireless communication module 14, and simultaneously transmits the trigger signal T3 to the second camera device 34b through the wired network module 16. After receiving the trigger signal T3, the first camera devices 32a and 32b and the second camera device 34b start photography in response to the trigger signal T3.

Figure 10:
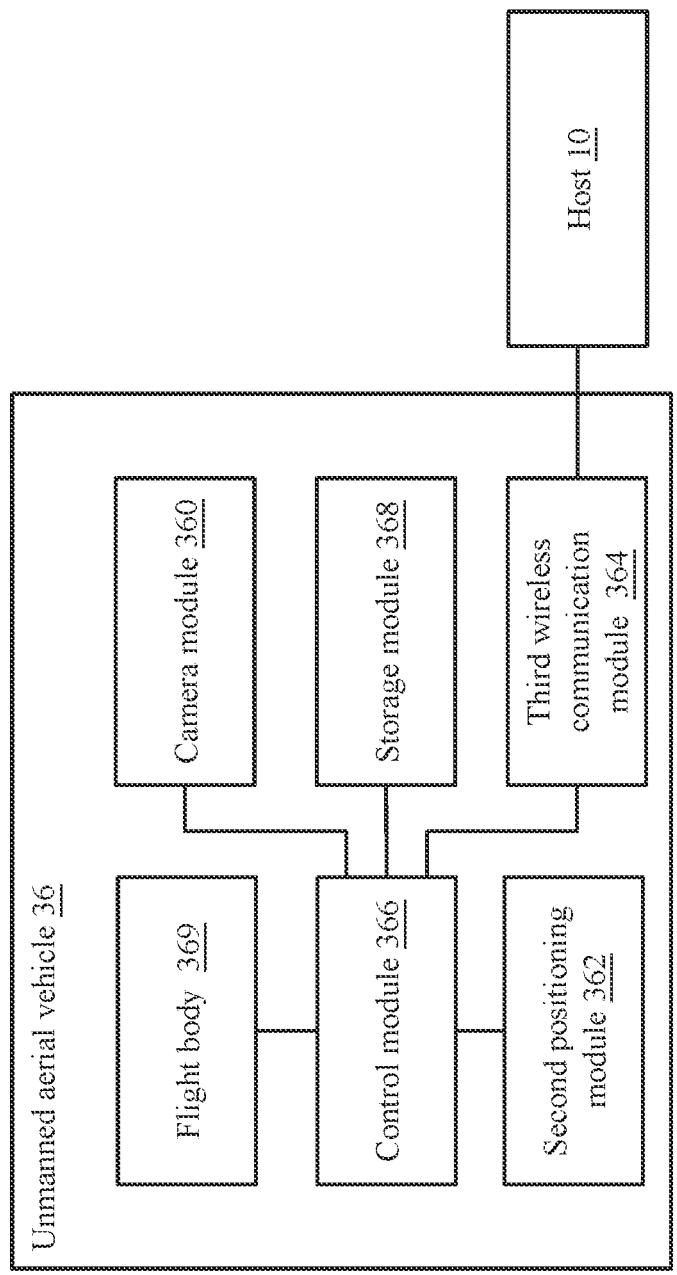
FIG. 10 is a functional block diagram of an exemplary example of an unmanned aerial vehicle in FIG. 1.

Refer to FIG. 10. In some embodiments, the photographic system further includes an unmanned aerial vehicle 36. The unmanned aerial vehicle 36 includes a flight body 369, a second positioning module 362, a third wireless communication module 364, a control module 366, and a camera module 360. The camera module 360, the second positioning module 362, the third wireless communication module 364, and the control module 366 are all located on the flight body 369, and the camera module 360, the second positioning module 362, and the third wireless communication module 364 are connected to the control module 366. Furthermore, the unmanned aerial vehicle 36 is connected to the first wireless communication module 14 of the host 10 through the third wireless communication module 364, thereby establishing communication between the unmanned aerial vehicle 36 and the host 10. When performing positioning, the second positioning module 362 may generate geographic data (hereinafter referred to as second geographic data) of a position of the unmanned aerial vehicle 36.

Refer to FIG. 4, FIG. 8, and FIG. 10 again. When the specified event occurs in the first camera device 32a (that is, the camera module 320 starts photography), the control module 366 generates the current event information I2 indicating the execution of the event. In this case, the first positioning module 322 of the first camera device 32a performs positioning on a position of the first camera device 32a, to generate the first geographic data G1. The control module 326 of the first camera device 32a sends the current event information I2 and the first geographic data G1 to the host 10 through the second wireless communication module 324. The processing module 18 of the host 10 receives the current event information I2 and the first geographic data G1 through the first wireless communication module 14, and then generates the trigger signal T2 according to the current event information I2. Subsequently, the processing module 18 transmits the trigger signal T2 to the second camera device 34 through the wired network module 16 and to the unmanned aerial vehicle 36 through the first wireless communication module 14.

The operation of the second camera device 34 after receiving the trigger signal T2 is as described above, which may not be described herein again. After receiving the trigger signal T2 and the first geographic data G1, the unmanned aerial vehicle 36 turns on the second positioning module 362 to position the unmanned aerial vehicle, and according to the second geographic data of the unmanned aerial vehicle 36 obtained by positioning and the received first geographic data G1, the unmanned aerial vehicle starts the flight body 369 and controls the flight body 369 to fly to a target position represented by the first geographic data G1. After the flight body 369 arrives at the target position, the control module 366 controls the camera module 360 on the unmanned aerial vehicle 36 to start photography.

In some embodiments, the unmanned aerial vehicle 36 may further include a storage module 368. The storage module 368 is connected to the control module 366. When the camera module 360 starts photography, the control module 366 can store the image generated by the camera module 360 when photographing the surrounding environment in the storage module 368. In addition, the storage module 328 may also store calculation formulas and parameters required by the flight body 369 when flying, so that the control module 366 may execute and control operation of the flight body 369.

Figure 11:
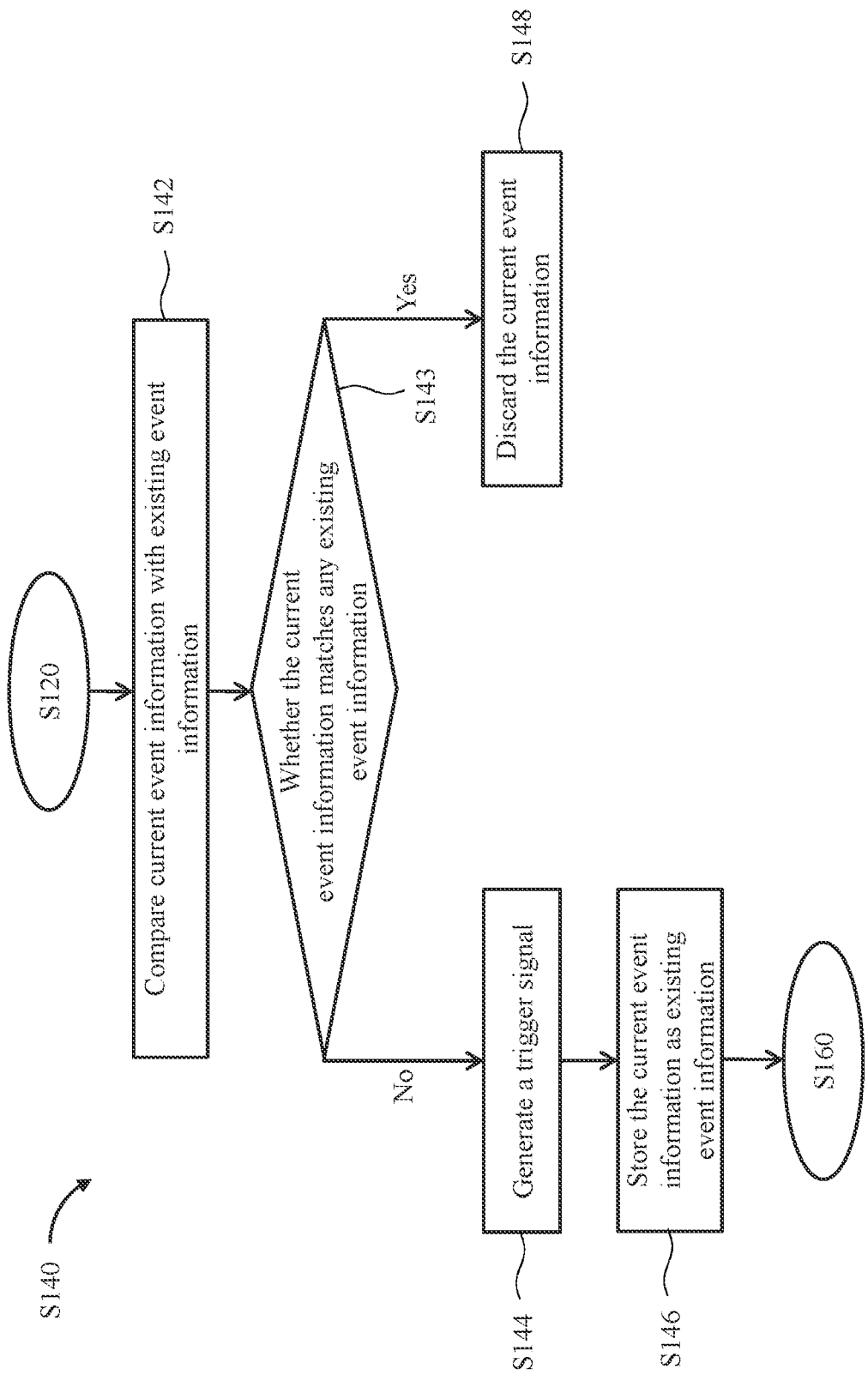
FIG. 11 is a flowchart of an exemplary example of step S140 in FIG. 4.

Refer to FIG. 2 and FIG. 11. In some embodiments, when receiving the current event information I1, I2, and I3, the host 10 may first confirm whether each of the current event information I1, I2, and I3 is a duplicate event, and then choose to generate or not generate the trigger signals T1, T2, and T3 according to a confirmation result.

In an exemplary example, after receiving the current event information I1, the processing module 18 determines whether to generate the trigger signal T1 by comparing the current event information I1 with existing event information. The host 10 may include a storage module 19, and the storage module 19 is coupled to the processing module 18. The storage module 19 may include at least one piece of existing event information. In some embodiments, when generating the trigger signal T1, the processing module 18 may also store the current event information I1 to the storage module 19. The current event information I1 that has been stored in the storage module 19 is used as the existing event information, to indicate that trigger signal T1 is generated according to the current event information to trigger another camera device 30 to start photography.

After receiving the current event information I1, the processing module 18 compares the current event information I1 with existing event information in the storage module 19 (step S142), and determines whether any existing event information matches the current event information I1 (step S143), generates the trigger signal T1 when the current event information I1 does not match the existing event information (step S144), and then stores the current event information I1 to the storage module 19 as existing event information (step S146). If the current event information I1 matches any existing event information in the storage module 19, the processing module 18 discards the current event information I1 and skips generating the trigger signal T1 (step S148).

In some embodiments, the determining whether the existing event information matches the current event information I1 may be performed by using an event identifier of the event information. As mentioned above, when the specified event occurs in the event device, the event device may generate current event information I1, I2, and I3 indicating the occurrence of the specified event, and send the generated current event information I1, I2, and I3 to the host 10. The occurrence of the specified event in the non-camera device 20 may means that the non-camera device 20 performs a specified operation, such as starting an engine of the vehicle 2, sounding a buzzer, lighting up an alerting light, or opening a coffer. The occurrence of the specified event in the camera device 30 may mean starting photography. The current event information I1, I2, and I3 indicating the occurrence of different specified events may each have a corresponding event identifier. For example, the current event information I1, I2, and I3 indicating the engine starting, the buzzer sounding, and photography by the camera device 30 may respectively correspond to different event identifiers. When the processing module 18 stores the current event information I1, I2, and I3 as existing event information, the event identifiers corresponding to the current event information I1, I2, and I3 are stored in the storage module 19.

After receiving the current event information I1, the processing module 18 may first confirm whether the current event information I1 has a corresponding event identifier. If yes, the processing module 18 extracts the event identifier for subsequent comparison. If no, the processing module 18 first identifies the specified event that occurs, and then gives an identifier to the current event information I1, and performs subsequent comparison by using the event identifier.

Subsequently, when the processing module 18 compares the event identifier corresponding to the current event information I1 with each event identifier in the storage module 19, if the event identifier corresponding to the current event information I1 does not match each event identifier in the storage module 19, the processing module 18 generates the trigger signal T1. If the event identifier corresponding to the current event information I1 matches any event identifier in the storage module 19, the processing module 18 discards the current event information I1 and skips generating the trigger signal T1.

Figure 12:
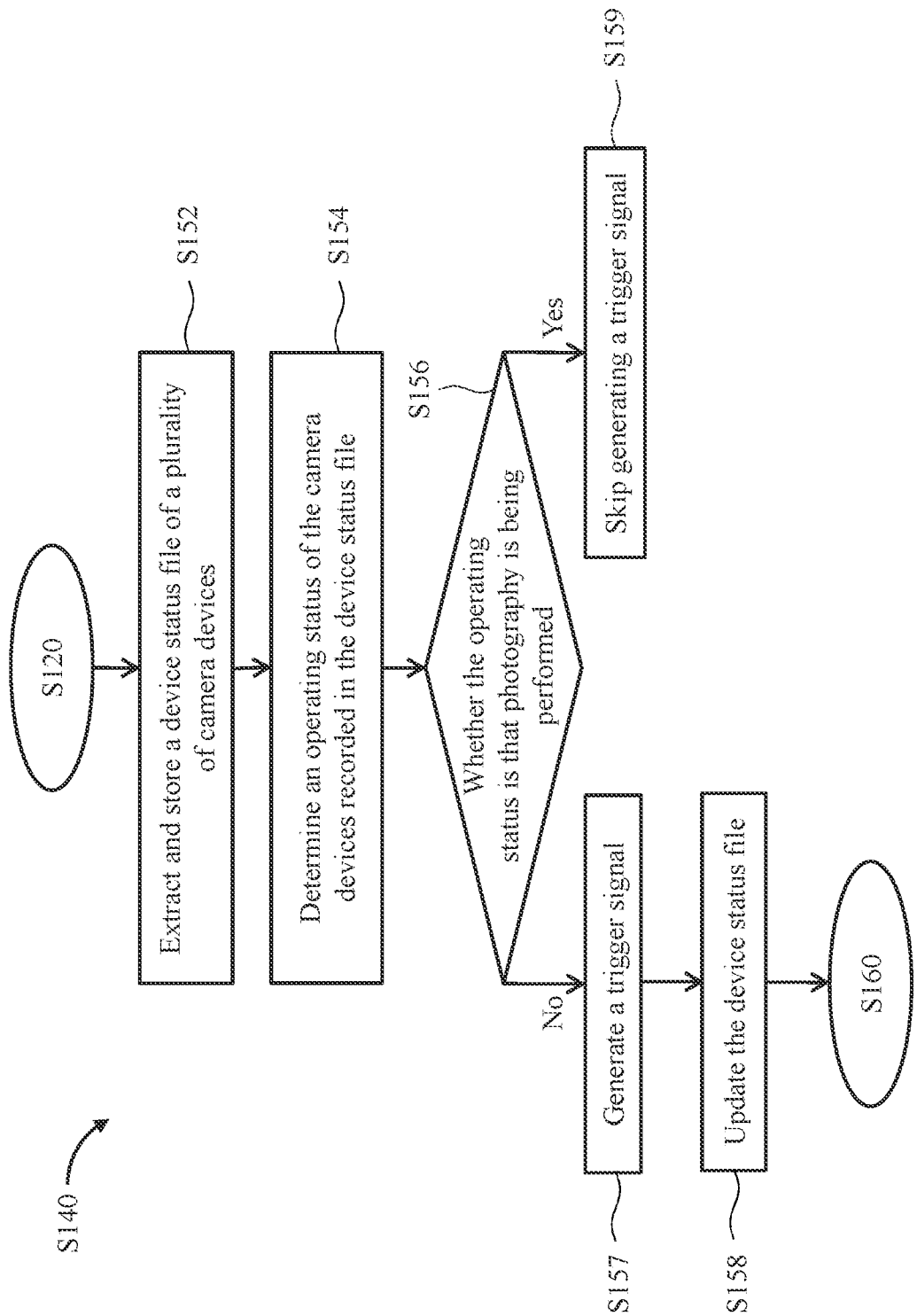
FIG. 12 is a flowchart of another exemplary example of step S140 in FIG. 4.

Refer to FIG. 2 and FIG. 12. In some other embodiments, after receiving the current event information I1, I2, and I3, the processing module 18 determines whether to generate the trigger signals T1, T2, and T3 based on an operating status of the plurality of camera devices 30. The storage module 19 in the host 10 may be configured to store a device status file, and the device status file records the operating status of the plurality of camera devices 30. The operating status may be mainly divided into "photography not in progress" and "photography in progress".

After receiving the current event information I1 from one of the control circuit 22, the first camera device 32, and the second camera device 34, the processing module 18 extracts and stores device status files of the first camera device 32 and the second camera device 34 (step S152). Then, the operating status of each camera device 30 recorded in the device status file is confirmed (step S154), and the trigger signal T1 is generated according to the operating status of the camera device 30 that generates the current event information I1 (step S156). If the operating status of the camera device 30 generating the current event information I1 is "photography not in progress", the camera device 30 starts photography, generates the trigger signal T1, and sends the trigger signal T1 to another camera device 30 (step S157). The another camera device 30 starts photography in response to the trigger signal T1, and updates the operating status of each camera device 30 in the device status file to "photography in progress" (step S158).

In some embodiments, the processing module 18 confirms the device status file according to the current event information I1. When the operating status of the camera device that generates the current event information I1 recorded in the device status file is "photography in progress", the processing module 18 responds to the operating status and skips generating the trigger signal T1 (step S159).

In some embodiments, the processing module 18 can determine whether the trigger signal T1 is generated according to the operating status of the plurality of camera devices 30. This is because when the operating status of the camera device 30 that generates the current event information I1 is "photography not in progress", it means that there is no trigger signal T1 transmitted to the camera device 30 before, and it can be inferred that the another camera device 30 is not in the operating status of "photography in progress". If the operating status of the camera device 30 that generates the current event information I1 is "photography in progress", it means that photography starts in response to the trigger signal T1 before. The trigger signal T1 is generated by the processing module 18 based on current event information I1 of another camera device 30, it can be inferred that the another camera device 30 is also in the operating status of "photography in progress", and there is no need to re-transmit the trigger signal T1 to cause the camera device 30 in "photography in progress" to restart photography.

It should be noted that although the above steps are described in order, this order is not a limitation of the present invention. A person skilled in the art should understand that the order of execution of some steps may be performed simultaneously or reversed under reasonable circumstances.

In some embodiments, the host 10 can be a host 10 mounted in a police car, a police station, a security unit, or any law enforcement-related unit.

In some embodiments, the data port 12 can be a variety of ports for transmitting data, and one data port 12 may be connected to the control circuit 22 of one non-camera device on a periphery, or may simultaneously be connected to the control circuits 22 of a plurality of non-camera devices 20 on the periphery.

In some embodiments, the wired network module 16 may be Ethernet, a phone line, a coaxial cable, a fiber optic, or the like.

In some embodiments, the wireless communication module may be a short-range communication unit supporting a short-range communication technology, and is configured to send a packet to a device that is located within a relatively short range of the first camera device 32 and the unmanned aerial vehicle 36 and that has a short-range communication unit, and/or receive a packet from a device that is located within a relatively short range of the first camera device 32 and the host 10 and that has a short-range communication unit. The short-range communication unit may, for example, use a transmitter, a receiver, or a transceiver using technologies such as a wireless local area network technology (WIFI), Bluetooth, radio frequency identification (RFID), Z-Wave, infrared communication technology (IrDA), ultra-wideband (UWB), or ZigBee.

In some embodiments, the host 10 may be additionally equipped with a wireless network module that supports long-distance communication technology, such as supporting 2G communication of GSM900 and GSM1800, 2.5G communication using time-sharing multiplexing (TDMA), 3G communication using code-division multiplexing (CDMA), using one of the 4G communication using high speed packet access (HSPA) or 5G communication using extremely high frequency (EHF) electromagnetic waves.

In some embodiments, any one of the processing module 18 and the control modules 326, 342, and 366 may be composed of one or more processing units. Each processing unit may be, for example, a microprocessor, a microcontroller, a digital signal processor (DSP), a central processing unit (CPU), a programmable logic controller (PLC), an application specific integrated circuit (ASIC), a field programmable gate array (FFPGA), a finite-state machine (FSM), or the like. In some embodiments, the processing unit may be implemented through an integrated circuit (IC), a system-on-a-chip (SoC), or any analog and/or digital device based on operating instructions and operating signals.

In some embodiments, the camera module 320 in each camera device 30 and unmanned aerial vehicle 36 may be implemented through an audio and video input device including a camera lens and/or a microphone. The first camera device 32 may be a body worn camera (BWC). The second camera device 34 may be an Internet Protocol camera (IPcam), an Internet Protocol camera center, or a driving recorder.

In some embodiments, the non-camera device 20 and the second camera device 34 may be located on the vehicle 2 such as a motorcycle, a car, a truck, a bus, or another traffic tool.

In some embodiments, the first positioning module 322 and the second positioning module 362 may be implemented through a global positioning system (GPS), or the like. The processing module 18 may determine whether to send the trigger signal T1 to only some of the camera devices 30 based on the first geographic data generated by the first positioning module 322, rather than to all camera devices 30 that generate the current event information I1.

In some embodiments, the storage module 19 may be implemented through one or more storage components. Each storage component includes a memory, a memory card, a cache, and the like, but this is not limited herein.

The flight body 369 of the unmanned aerial vehicle 36 may include a flight mechanism and a driving circuit.

Based on the above, according to any embodiment, when a specified event occurs in any one of the non-camera device 20, the first camera device 32, or the second camera device 34, the camera device other than the event device may also start photography, to use images to record changes in the surrounding environment, thereby recording events more comprehensively during occurrence.

What is claimed is:
1. A photographic system, comprising:
a host, comprising:
at least one data port, connected to a control circuit of at least one non-camera device on a periphery;
a first wireless communication module;
a wired network module; and
a processing module, connected to the at least one data port, the first wireless communication module, and the wired network module to receive current event information from one of the at least one data port, the first wireless communication module, or the wired network module; and
a plurality of camera devices, connected to the host, wherein the plurality of camera devices comprise:
at least one first camera device, wirelessly connected to the first wireless communication module, wherein the at least one first camera device is configured to photograph a surrounding environment and correspondingly generate the current event information indicating that photography starts; and
at least one second camera device, connected to the wired network module by a wire, wherein the at least one second camera device is configured to photograph the surrounding environment and correspond- ingly generate the current event information indicating that photography starts,
wherein the current event information is generated by one of the at least one non-camera device, the at least one first camera device, or the at least one second camera device, the processing module generates a trigger signal according to the current event information, and the trigger signal triggers the plurality of camera devices except the at least one first camera device or the at least one second camera device generating the current event information to start photography.

2. The photographic system according to claim 1, wherein the host further comprises:
a storage module, coupled to the processing module,
wherein when generating the trigger signal, the processing module further stores the current event information to the storage module as existing event information.

3. The photographic system according to claim 2, wherein the processing module compares the current event information with the existing event information, and generates the trigger signal when the current event information does not match the existing event information.

4. The photographic system according to claim 3, wherein when the current event information matches any existing event information, the processing module discards the current event information and skips generating the trigger signal.

5. The photographic system according to claim 1, wherein the host further comprises:
a storage module, coupled to the processing module, and storing a device status file, wherein the device status file records an operating status of the plurality of camera devices.

6. The photographic system according to claim 5, wherein the current event information is from one of the plurality of camera devices, the processing module confirms the device status file according to the current event information and generates the trigger signal when the operating status of the at least one first camera device or the at least one second camera device generating the current event information is that photography is not performed.

7. The photographic system according to claim 6, wherein the processing module skips generating the trigger signal when the operating status of the at least one first camera device or the at least one second camera device generating the current event information is that photography is being performed.

8. The photographic system according to claim 1, wherein the current event information is from the control circuit of one of the at least one non-camera device, and the processing module sends the trigger signal to the at least one first camera device through the first wireless communication module and sends the trigger signal to the at least one second camera device through the wired network module.

9. The photographic system according to claim 1, wherein the at least one first camera device comprises:
a camera module, configured to photograph the surrounding environment;
a first positioning module, configured to perform positioning to generate first geographic data;
a second wireless communication module, configured to wirelessly connect the first wireless communication module; and
a control module, connected to the camera module, the first positioning module, and the second wireless communication module, and configured to control operation of the camera module and generate the current event information comprising the first geographic data when the camera module starts photography.

10. The photographic system according to claim 9, further comprising:
an unmanned aerial vehicle, connected to the first wireless communication module, wherein the unmanned aerial vehicle comprises:
a flight body;
a second camera module, located on the flight body;
a second positioning module, located on the flight body and configured to perform positioning to generate second geographic data;
a third wireless communication module, located on the flight body; and
a second control module, connected to the flight body, the second camera module, and the third wireless communication module, and configured to receive the trigger signal through the third wireless communication module and control operation of the flight body and the second camera module according to the trigger signal,
wherein the current event information is from any of the at least one first camera device, the trigger signal generated by the processing module comprises the first geographic data in the current event information, the second control module controls, according to the first geographic data in the trigger signal and the second geographic data, the flight body to fly to a target position, and controls the second camera module to start photography when the flight body arrives at the target position.

11. The photographic system according to claim 1, wherein the at least one first camera device is a body worn camera (BWC).

12. The photographic system according to claim 1, wherein the at least one second camera device is an Internet Protocol camera (IPcam), an Internet Protocol camera center, or a driving recorder.

13. The photographic system according to claim 1, wherein the at least one non-camera device is at least one of a vehicle-mounted engine, a vehicle-mounted door, a buzzer, an alerting light, or a coffer.

14. A control method for heterogeneous video architecture, comprising:
connecting a control circuit of at least one non-camera device on a periphery through at least one data port;
wirelessly connecting at least one first camera device in a plurality of camera devices through a wireless communication module;
connecting at least one second camera device in the plurality of camera devices by a wire through at least one connection cable;
receiving current event information through one of the at least one data port, the wireless communication module, and the at least one connection cable, wherein the current event information indicates that the at least one first camera device or the at least one second camera device generating the current event information starts to photograph a surrounding environment or indicates that the at least one non-camera device generating the current event information performs a specified operation;
generating a trigger signal according to the current event information;
sending the trigger signal to the plurality of camera devices except the at least one first camera device or the at least one second camera device generating the current event information; and starting photography in response to the trigger signal.

15. The control method for the heterogeneous video architecture according to claim 14, further comprising:
storing at least one piece of existing event information,
wherein generating the trigger signal according to the current event information comprises:
comparing the current event information with the existing event information; and
generating the trigger signal in a case that the current event information does not match the existing event information, and storing the current event information as a piece of existing event information.

16. The control method for the heterogeneous video architecture according to claim 15, wherein generating the trigger signal according to the current event information comprises:
in a case that the current event information matches any existing event information, discarding the current event information and skipping generating the trigger signal.

17. The control method for the heterogeneous video architecture according to claim 14, wherein generating the trigger signal according to the current event information comprises:
storing a device status file, wherein the device status file records an operating status of the plurality of camera devices;
confirming the device status file according to the current event information; and
generating the trigger signal in a case that the operating status of the at least one first camera device or the at least one second camera device generating the current event information is that photography is not performed.

18. The control method for the heterogeneous video architecture according to claim 17, wherein generating the trigger signal according to the current event information comprises:

skipping generating the trigger signal in a case that the operating status of the at least one first camera device or the at least one second camera device generating the current event information is that photography is being performed.

19. The control method for the heterogeneous video architecture according to claim 14, wherein in receiving the current event information generated by the control circuit of the at least one non-camera device and one of the plurality of camera devices, the current event information is generated by the control circuit of any of the at least one non-camera device, and sending the trigger signal to the plurality of camera devices except the at least one first camera device or the at least one second camera device generating the current event information comprises:
sending the trigger signal to the at least one first camera device through the wireless communication module, to trigger the at least one first camera device to start photography; and
sending the trigger signal to the at least one second camera device through the at least one connection cable, to trigger the at least one second camera device to start photography.

20. The control method for the heterogeneous video architecture according to claim 14, further comprising:
sending the trigger signal to an unmanned aerial vehicle through the wireless communication module, to trigger the unmanned aerial vehicle to fly to a target position and start photography after arriving at the target position, wherein the current event information comprises geographic data indicating a position at which an event occurs, and the target position corresponds to the geographic data.

* * * * *